(12) United States Patent
Helmer et al.

(10) Patent No.: US 9,358,832 B2
(45) Date of Patent: Jun. 7, 2016

(54) HUBOMETER MOUNTING ARRANGEMENT FOR USE WITH TIRE INFLATION SYSTEM

(71) Applicant: SAF-HOLLAND, Inc., Holland, MI (US)

(72) Inventors: Christopher Helmer, Hudsonville, MI (US); Riley Carter, Muskegon, MI (US); Perry Thomas, Muskegon, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 104 days.

(21) Appl. No.: 14/205,426

(22) Filed: Mar. 12, 2014

(65) Prior Publication Data
US 2014/0261940 A1 Sep. 18, 2014

Related U.S. Application Data

(60) Provisional application No. 61/792,316, filed on Mar. 15, 2013.

(51) Int. Cl.
*B60B 27/06* (2006.01)
*G01C 22/00* (2006.01)
*B60B 27/00* (2006.01)

(52) U.S. Cl.
CPC ........... *B60B 27/0068* (2013.01); *B60B 27/065* (2013.01); *G01C 22/00* (2013.01); *B60B 2900/113* (2013.01); *B60B 2900/321* (2013.01)

(58) Field of Classification Search
CPC ............................ B60B 27/0068; G01C 22/00
USPC ....................................... 235/95 B; 33/203.18
See application file for complete search history.

(56) References Cited

U.S. PATENT DOCUMENTS

| | | | | |
|---|---|---|---|---|
| 1,326,967 A * | 1/1920 | Donat | ................... | G01C 22/00 235/95 B |
| 1,368,504 A | 2/1921 | Karich | | |
| 3,779,456 A * | 12/1973 | Burnett | ................... | G01P 1/04 235/95 B |
| 4,294,334 A * | 10/1981 | Shinoda | ................ | B60B 35/121 188/18 A |
| 4,506,147 A * | 3/1985 | Powell | ................... | G01C 22/00 235/131 JA |
| 4,918,295 A | 4/1990 | Sauber | | |
| 5,003,704 A * | 4/1991 | Schubert | ................. | G01P 3/481 235/95 B |
| 5,011,302 A * | 4/1991 | Mott | ...................... | G01P 3/443 188/181 A |
| 5,190,355 A * | 3/1993 | Hobbie | ................. | F16C 33/723 301/105.1 |
| 6,547,128 B1* | 4/2003 | Shimura | ................ | G01C 22/00 235/95 B |
| 6,997,615 B2* | 2/2006 | Takada | ................ | B60B 27/0005 384/448 |
| 8,585,298 B2* | 11/2013 | Komori | ............... | B60B 27/0005 384/448 |
| 8,764,299 B2* | 7/2014 | Torii | ................... | B60B 27/0005 384/448 |
| 8,882,358 B2* | 11/2014 | Inohae | ................ | B60B 27/0005 384/448 |
| 9,056,523 B2* | 6/2015 | Norimatsu | .......... | B60B 27/0068 |
| 2009/0206218 A1 | 8/2009 | Massey | | |

* cited by examiner

*Primary Examiner* — Christopher Fulton
(74) *Attorney, Agent, or Firm* — Price Heneveld LLP

(57) ABSTRACT

An axle assembly includes an axle member having a first end and a second end opposite the first end, a first axle hub assembly operably coupled to the first end of the axle member, and a second hub assembly operably coupled to the second end of the axle member and including an axle hubcap coupled to the second end of the axle member by a first coupling arrangement located at a first position. The axle assembly further includes a mounting bracket coupled to the second hub assembly by a second coupling arrangement located at a second position that is at least a select one of inwardly and outwardly radially spaced from the first position, and a hubometer attached to the mounting bracket.

20 Claims, 5 Drawing Sheets

US 9,358,832 B2

HUBOMETER MOUNTING ARRANGEMENT FOR USE WITH TIRE INFLATION SYSTEM

BACKGROUND OF THE INVENTION

The present invention relates to an axle assembly, and in particular to an axle assembly including a hubometer mounting arrangement adapted for use in conjunction with a tire inflation system.

A hubometer is a device mounted on an axle of a vehicle that measures the distance traveled. Specifically, the hubometer is designed such that the majority of the device rotates along with the associated wheel except for a peripherally mounted weight located on an internal shaft thereof which remains located at a downward point of the rotation that drives a counting mechanism as the body of the hubometer rotates.

Hubometers are used in a wide variety of vehicle applications. A prior art vehicle axle assembly 10 (FIG. 1) illustrates a hubometer mounting arrangement typically used in conjunction with heavy duty vehicle axle assemblies. In the illustrated example, the vehicle axle assembly 10 includes an axle member 12 supporting a hub assembly 14 and a brake assembly 16 thereon. The axle assembly 10 further supports an axle hub cap 18 secured to an end of the axle member 12 by a plurality of screws 20 spaced circumferentially thereabout.

BRIEF SUMMARY OF THE INVENTION

One aspect of the present invention is to provide an axle assembly comprising an axle member having a first end and second end opposite the first end, an axle hub assembly operably coupled to the first end of the axle member, and a second hub assembly operably coupled to the second end of the axle member, and including an axle hub cap coupled to the second end of the axle member by a first coupling arrangement located at a first position. The axle assembly further comprises a mounting bracket coupled to the second hub assembly by a second coupling arrangement located at a second position that is at least a select one of inwardly and outwardly radially spaced from the first position, and a hubometer attached to the mounting bracket.

The present inventive hubometer mounting arrangement allows easy and quick installation of the hubometer assembly, and use of the hubometer assembly in conjunction with a tire inflation system. The mounting arrangement is durable, incorporates an uncomplicated design, and may be easily and quickly assembled by relatively unskilled personnel with basic tools. However, the mounting arrangement is economical to manufacture, capable of a long operating life, and is particularly well adapted for the proposed use.

These and other features, advantages, and objects of the present invention will be further understood and appreciated by those skilled in the art by reference to the following written specification, claims, and appended drawings.

DETAILED DESCRIPTION

Figure 1:
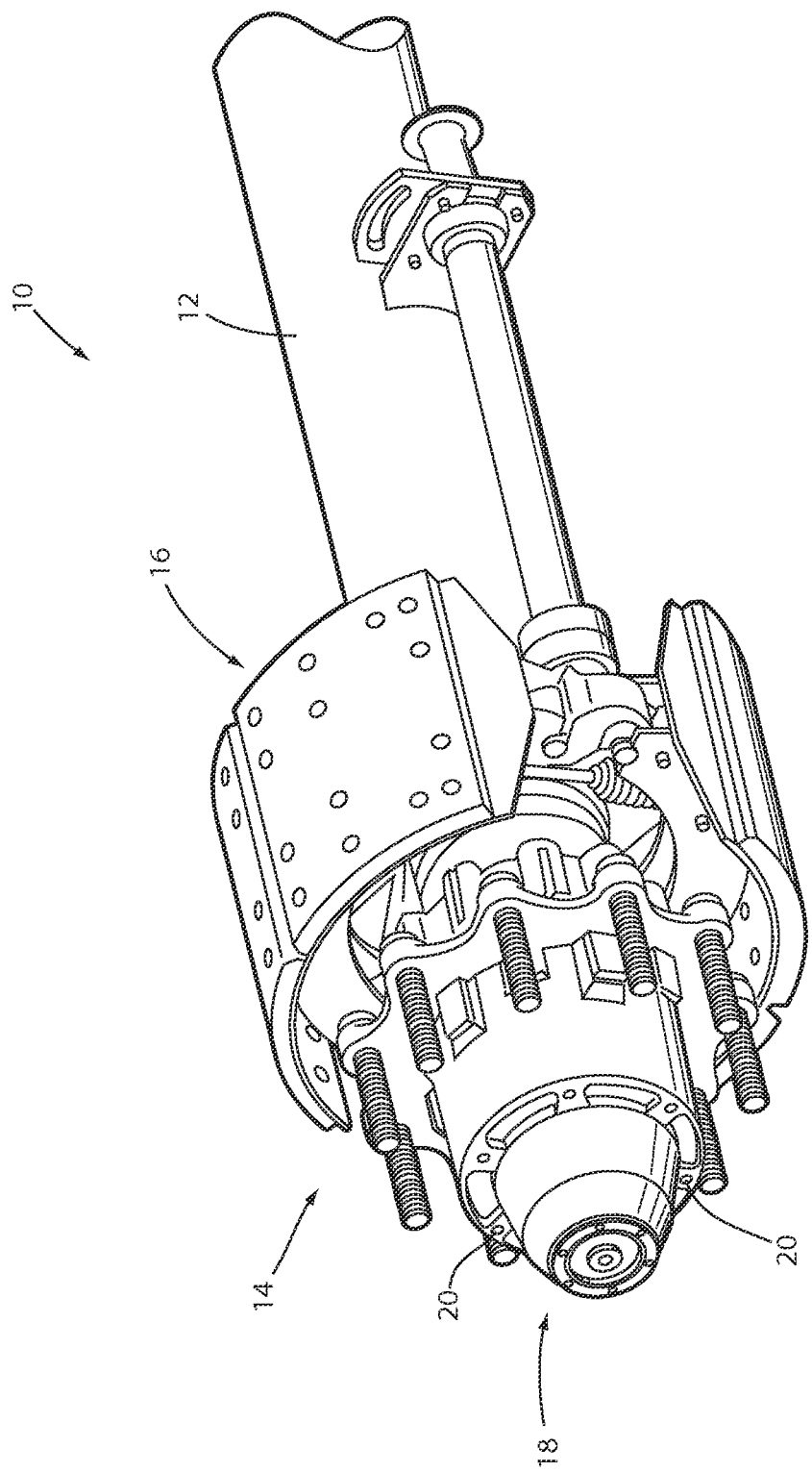
FIG. 1 is a perspective view of a prior art axle assembly.
Figure 2:
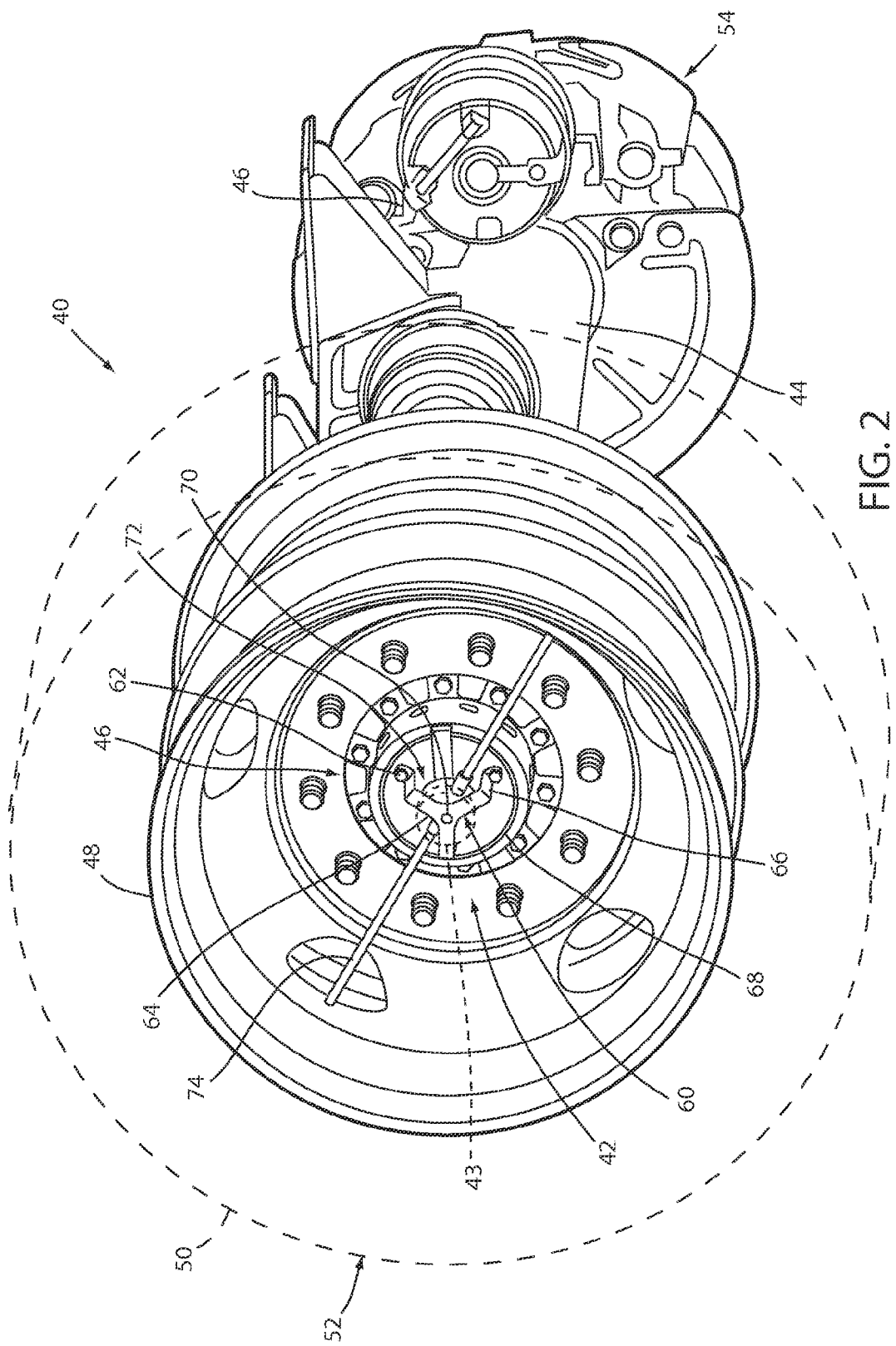
FIG. 2 is a perspective view of an axle assembly including a first embodiment of a hubometer mounting arrangement.
Figure 3:
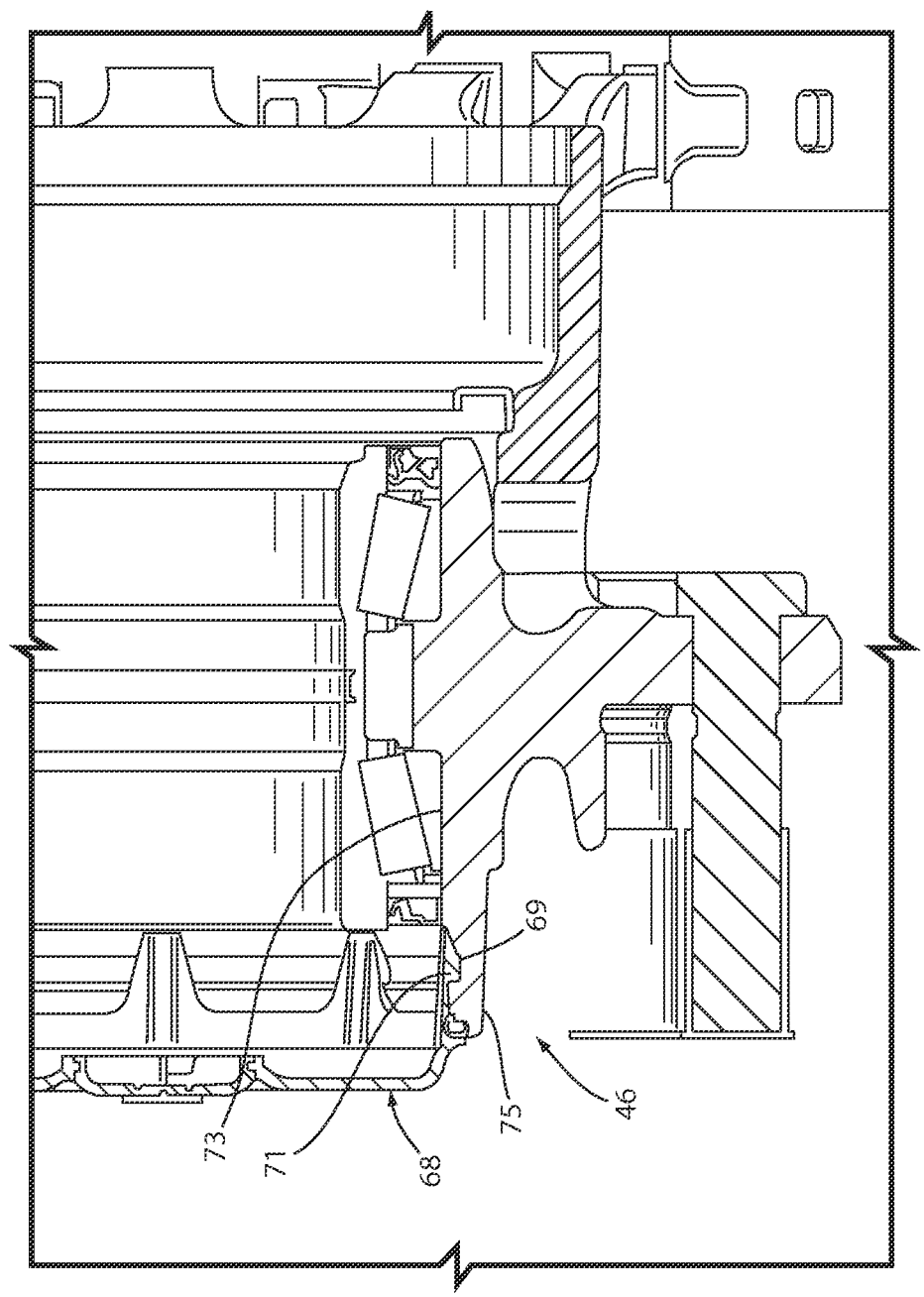
FIG. 3 is a cross-sectional view of the axle assembly illustrating a snap-fit axle hub cap arrangement.
Figure 4:
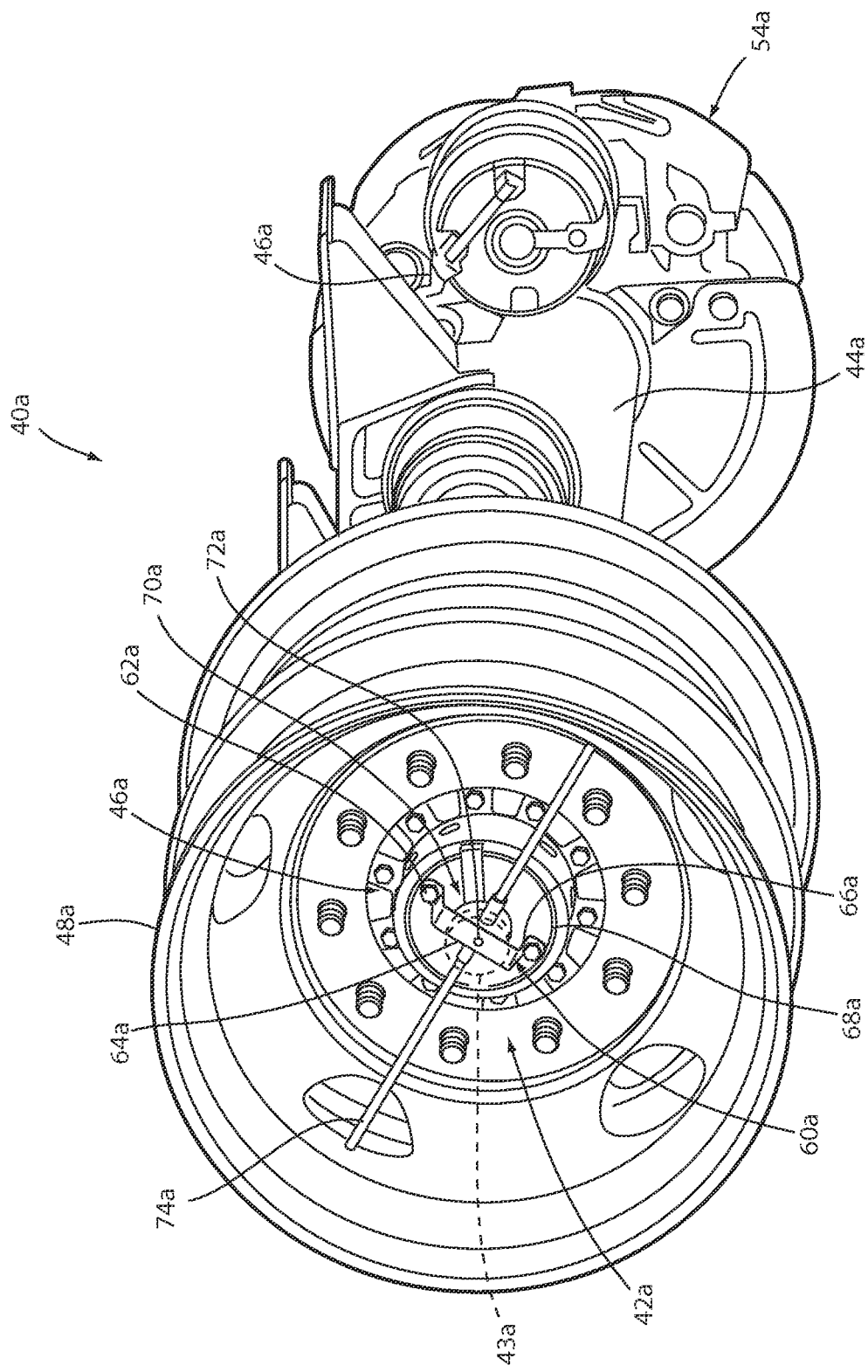
FIG. 4 is a perspective view of an axle assembly including a second embodiment of a hubometer mounting arrangement.

For purposes of description herein, the terms "upper," "lower," "right," "left," "rear," "front," "vertical," "horizontal," and derivatives thereof shall relate to the invention as oriented in FIGS. 2-4. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 40 (FIG. 2) generally designates a vehicle suspension assembly that includes a hubometer mounting arrangement 42 embodying the present invention and adapted for mounting a hubometer assembly 43 to the remainder of the vehicle suspension assembly 40. In the illustrated example, the vehicle suspension assembly 40 includes an axle member 44, a pair of hub assemblies 46 operably coupled to opposite ends of the axle member 44 and supporting the wheels 48 and tires 50 of multiple wheel assemblies 52 thereon, and a pair of brake assemblies 54.

FIG. 2 illustrates a first embodiment of the hubometer mounting arrangement 42 that includes a mounting bracket 60 secured to one of the ends of the axle member 44 by a plurality of mechanical fasteners, such as screws or bracket mounting bolts 62. In the illustrated example, the mounting bracket 60 includes a central hub portion 64 and three L-shaped legs 66 extending outwardly therefrom and spaced circumferentially thereabout. The legs 66 are secured to an axle hub cap 68 by the plurality of bracket mounting bolts 62, wherein the axle hub cap 68 is snap-fit to an end of the axle member 44. As best illustrated in FIG. 3, the axle hub cap 68 includes a plurality of flexibly resilient engagement fingers 69 that snappingly engage a groove 71 located on an inner diameter 73 of hub 75 of the hub assembly 46. It is noted that the plurality of screws 62 are located radially inward of the plurality of fingers 69. The central hub portion 64 is provided with a central aperture 70 to which the hubometer is mounted, and is spaced from the axle hub cap 68 so as to define a space or gap 72 therebetween. Components of an air inflation system 74 extend through the gap 72 and is operably coupled to the tires 50 and a pneumatic pressure source (not shown).

The reference numeral 42a (FIG. 4) generally designates a second embodiment of a hubometer mounting arrangement. Since the hubometer mounting arrangement 42a is similar to the previously described hubometer mounting arrangement 42, similar parts appearing in FIG. 2 and in FIG. 4 are represented by the same, corresponding reference numeral, except for the suffix "a" in the numerals of the latter. In the illustrated example, the mounting arrangement 42a is similar to the mounting arrangement 42, with the most notable exception being that the mounting arrangement 42a includes a pair of L-shaped legs 66a while the mounting arrangement 42 includes three legs 66. It is noted that the plurality of screws 62a are located radially inward of the outer circumference of the plurality of fingers 69.

Figure 5:
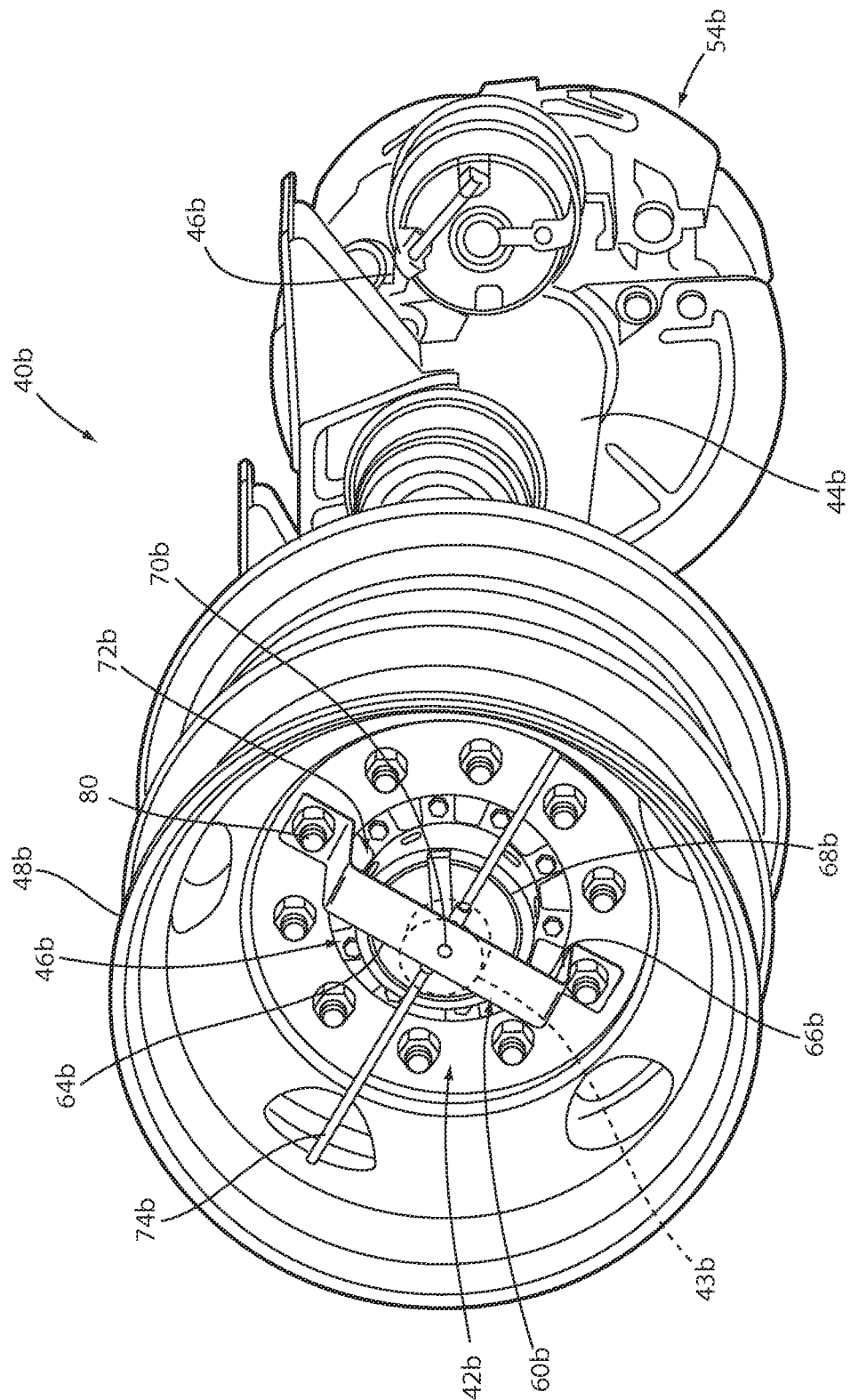
FIG. 5 is a perspective view of an axle assembly including a third embodiment of a hubometer mounting arrangement.

The reference numeral 42b (FIG. 5) generally designates a third embodiment of the present invention. Since the hubometer mounting arrangement 42b is similar to the previously described hubometer mounting arrangement 42a, similar parts appearing in FIG. 4 and FIG. 5 are represented by the same, corresponding reference numeral, except for the suffix "b" in the numerals of the latter. In the illustrated example, the mounting arrangement 42b is similar to the mounting arrangement 42a, with the most notable exception being that the mounting arrangement 42b is sized so as to extend over the end of the axle member 44b such that the legs 66b are secured to the hub assembly 46b via lug bolts and lug nuts 80 that attach the wheel assembly 48b to the hub assembly 46b. It is noted that the plurality of lug bolts and lug nuts 80 are located radially outward of the outer circumference of the plurality of fingers 69.

In the foregoing description, it would be readily appreciated by those skilled in the art that modifications may be made to the invention without departing from the concepts disclosed herein. Such modifications are to be considered as included in the following claims, unless these claims by their language expressly state otherwise.

The invention claimed is:

1. An axle assembly, comprising:
   an axle member having a first end and a second end opposite the first end;
   a first axle hub assembly operably coupled to the first end of the axle member;
   a second axle hub assembly operably coupled to the second end of the axle member, and including an axle hubcap coupled to the second end of the axle member by a first coupling arrangement located at a first position;
   a mounting bracket coupled to the second hub assembly by a second coupling arrangement located at a second position that is at least a select one of inwardly and outwardly radially spaced from the first position;
   a hubometer assembly attached to the mounting bracket wherein the hubometer assembly is attached to a mounting portion of the mounting bracket, and wherein the mounting portion of the mounting bracket cooperates with the second axle hubcap to define a gap therebetween; and
   a tire inflation device at least partially within the gap.

2. The axle assembly of claim 1, wherein the mounting portion of the mounting bracket includes a centrally disposed aperture, and wherein the hubometer assembly is attached to the aperture.

3. The axle assembly of claim 2, wherein the mounting bracket includes at least a pair of mounting legs extending from the mounting portion and coupled to the second axle hub assembly by the second coupling arrangement.

4. The axle assembly of claim 3, wherein the at least a pair of mounting legs extending from the mounting portion include three mounting legs.

5. The axle assembly of claim 3, wherein the at least a pair of mounting legs are each L-shaped.

6. The axle assembly of claim 3, wherein the second coupling arrangement comprises a mechanical fastener.

7. The axle assembly of claim 6, wherein the mechanical fastener comprises a bolt.

8. The axle assembly of claim 1, wherein the hubometer assembly is attached to a mounting portion of the mounting bracket, and wherein the mounting portion of the mounting bracket includes a centrally disposed aperture, and wherein the hubometer assembly is attached to the aperture.

9. The axle assembly of claim 1, wherein the hubometer assembly is attached to a mounting portion of the mounting bracket, and wherein the mounting bracket includes at least a pair of mounting legs extending from the mounting portion and coupled to the second axle hub assembly by the second coupling arrangement.

10. The axle hub assembly of claim 9, wherein the at least a pair of mounting legs extending from the mounting portion include three mounting legs.

11. The axle hub assembly of claim 9, wherein the at least a pair of mounting legs are each L-shaped.

12. The axle assembly of claim 1, wherein the second coupling arrangement comprises a mechanical fastener.

13. The axle assembly of claim 12, wherein the mechanical fastener comprises a bolt.

14. The axle assembly of claim 1, wherein the second coupling arrangement is inwardly radially spaced from the first coupling arrangement.

15. The axle assembly of claim 14, wherein the mounting bracket is coupled to the axle hubcap of the second hub arrangement.

16. The axle assembly of claim 15, wherein the second coupling arrangement comprises a mechanical fastener.

17. The axle assembly of claim 16, wherein the mechanical fastener comprises a bolt.

18. The axle assembly of claim 1, wherein the second coupling arrangement is outwardly radially spaced from the first coupling arrangement.

19. The axle assembly of claim 18, wherein the second coupling arrangement includes a plurality of lug bolts adapted to mount a wheel to the second hub assembly.

20. The axle assembly of claim 1, wherein the first coupling arrangement is a snap connection.

* * * * *